US008730802B2

(12) United States Patent
Munje

(10) Patent No.: US 8,730,802 B2
(45) Date of Patent: May 20, 2014

(54) METHOD AND SYSTEM FOR TRANSMITTING PACKETS

(75) Inventor: Arun Munje, Kanata (CA)

(73) Assignee: BlackBerry Limited, Waterloo (CA)

( * ) Notice: Subject to any disclaimer, the term of this patent is extended or adjusted under 35 U.S.C. 154(b) by 1451 days.

(21) Appl. No.: 11/424,710

(22) Filed: Jun. 16, 2006

(65) Prior Publication Data

US 2007/0291795 A1  Dec. 20, 2007

(51) Int. Cl.
*H04W 76/04* (2009.01)
(52) U.S. Cl.
CPC .................................. *H04W 76/045* (2013.01)
USPC ........... 370/231; 370/229; 370/235; 370/332; 370/395.42; 370/395.71; 370/429; 370/450; 370/458; 370/459
(58) Field of Classification Search
USPC ................. 370/498, 395.42, 22; 455/450–455
See application file for complete search history.

(56) References Cited

U.S. PATENT DOCUMENTS

| | | | |
|---|---|---|---|
| 6,205,498 B1 | 3/2001 | Habusha et al. | |
| 6,456,604 B1 * | 9/2002 | Lee et al. | 370/328 |
| 6,781,979 B1 * | 8/2004 | Ebata et al. | 370/338 |
| 6,785,283 B1 * | 8/2004 | Stichter | 370/395.42 |
| 7,027,417 B1 * | 4/2006 | Verkama et al. | 370/329 |
| 7,113,790 B2 * | 9/2006 | Athalye | 455/450 |
| 7,304,951 B2 * | 12/2007 | Rhee | 370/235 |
| 2004/0162031 A1 | 8/2004 | Athalye | |
| 2006/0072563 A1 * | 4/2006 | Regnier et al. | 370/389 |
| 2006/0227706 A1 * | 10/2006 | Burst | 370/229 |

FOREIGN PATENT DOCUMENTS

EP            1 452 988 A       1/2004

* cited by examiner

*Primary Examiner* — Faruk Hamza
*Assistant Examiner* — Aixa A Guadalupe-Cruz
(74) *Attorney, Agent, or Firm* — Moffat & Co.

(57) ABSTRACT

A system and method of transmitting packets from a wireless device is provided. According to a broad aspect, the wireless device is to transmit a packet on a communication channel during a time window based on whether or not the communication channel is expected to be torn down during the time window. If the communication channel is not expected to be torn down during the time window, then the wireless device transmits the packet late in the time window. However, if the communication channel is expected to be torn down during the time window, then the wireless device transmits the packet during the time window just prior to when the communication channel is expected to be torn down. This prevents having to re-establish the communication channel merely to transmit the packet if the communication channel is torn down.

18 Claims, 12 Drawing Sheets

METHOD AND SYSTEM FOR TRANSMITTING PACKETS

FIELD OF THE APPLICATION

The application relates to wireless communication, and more particularly to transmitting packets.

BACKGROUND

In some instances, a wireless device may be required to send a message that has been scheduled for transmission. Such messages may be scheduled synchronisation messages, which are transmitted on a scheduled basis for synchronising information between the wireless device and another node. Such messages are ideally transmitted according to a scheduled time, but may be transmitted earlier.

In other instances, a wireless device may be required to acknowledge receipt of a packet. Such acknowledgement takes form of an acknowledgement message sent from the wireless device to the network. When the network receives the acknowledgement message, the network is provided with a confirmation that the wireless device has received the packet. In absence of such confirmation by a predetermined time after sending the data packet, the network assumes that the wireless device did not receive the packet and will re-send the packet. An acknowledgement message may acknowledge receipt of more than one received packet. Waiting before sending an acknowledgement message may allow additional received packets to be acknowledged by a single acknowledgement message.

Packet communication to and from the wireless device is done so over a communication channel. If a wireless device is to transmit a packet, and its communication channel has been torn down, then the wireless device re-establishes the communication channel to transmit the packet. Re-establishing the communication channel consumes resources. First, establishing the communication channel consumes network resources. Second, establishing the communication channel consumes battery power of the wireless device. Third, establishing the communication channel requires time.

BRIEF DESCRIPTION OF THE DRAWINGS

Preferred embodiments will now be described with reference to the attached drawings in which.

DETAILED DESCRIPTION OF THE PREFERRED EMBODIMENTS

Figure 1:
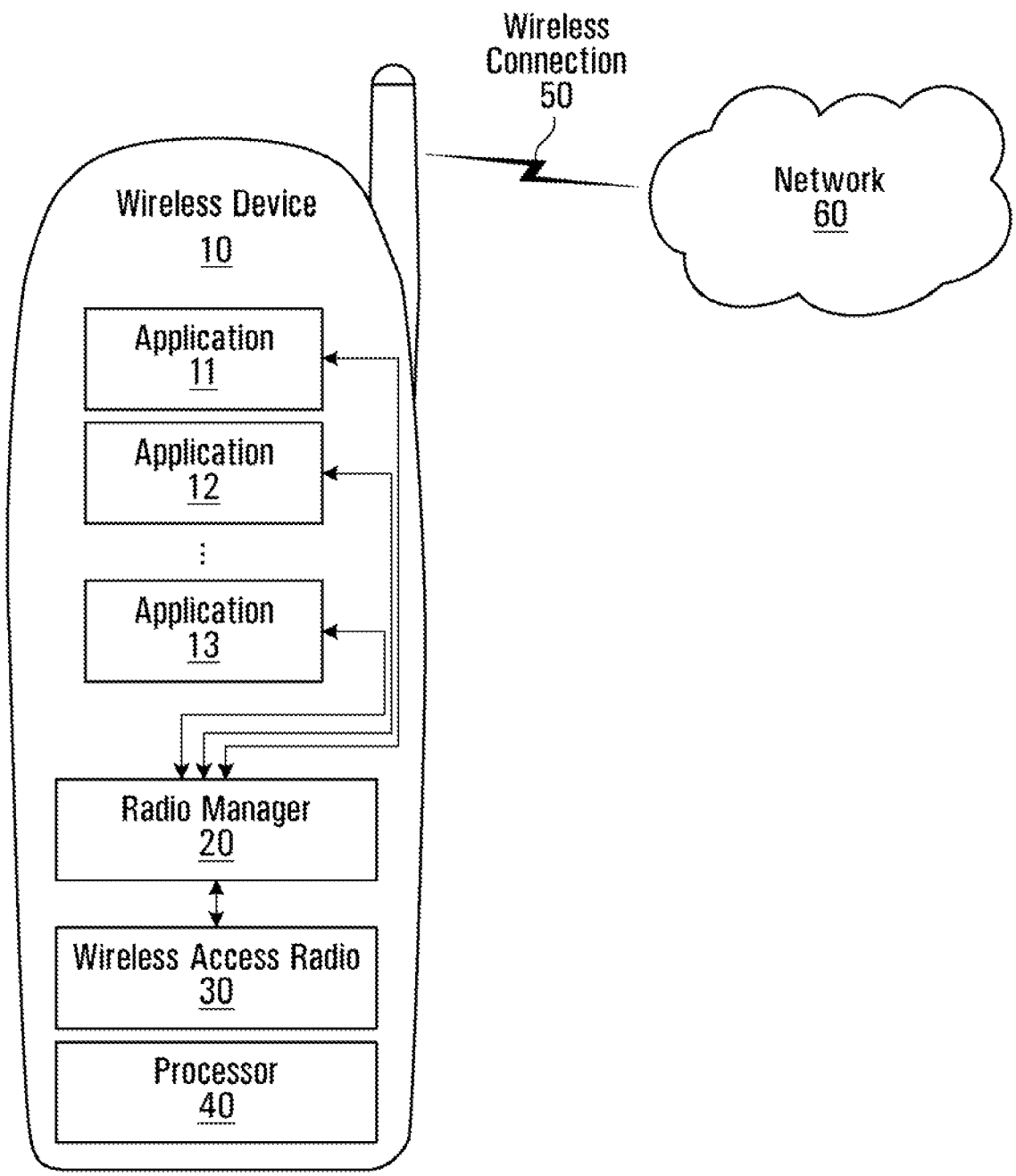
FIG. 1 is a block diagram of a wireless device coupled to a network.

According to a broad aspect, there is provided a method comprising: identifying a time window during which a packet must be transmitted; and transmitting the packet on a communication channel at some time during the time window based on whether the communication channel is expected to be torn down during the time window.

In some embodiments, the duration of the time window is dependent upon the first packet.

In some embodiments, the method further comprises: starting a timer upon receipt of the first packet; wherein the timer is indicative of the duration of the time window.

In some embodiments, the packet transmitted is an acknowledgement packet for acknowledging receipt of at least one previously received packet.

In some embodiments, the packet transmitted is a synchronisation packet for providing synchronisation information to a recipient of the packet.

In some embodiments, the method further comprises: determining that one of the plurality of packets is to be transmitted in lieu of another one of the plurality of packets; and removing the another one of the plurality of packets from the queue together with its respective time window.

In some embodiments, the method further comprises: if the communication channel is expected to be torn down during the time window, estimating resource utilisation for transmitting the packet before and after when the communication channel is expected to be torn down; and transmitting the packet on the communication channel at some time during the time window based on the estimated resource utilisation.

In some embodiments, the method further comprises: if the estimated resource utilisation indicates favourability in transmitting the packet after when the communication channel is expected to be torn down: a) allowing the communication channel to be torn down; b) re-establishing the communication channel late in the time window but no later than a predetermined time period before expiry of the time window; and c) transmitting the packet on the communication channel late in the time window.

In some embodiments, estimating resource utilisation comprises at least one of: consideration of battery utilisation; consideration of network resources; and consideration of time required to establish the communication channel.

According to another broad aspect, there is provided a computer readable medium having computer readable instructions stored thereon for execution on a wireless device so as to implement the method summarised above.

According to another broad aspect, there is provided a wireless device adapted to implement the method summarised above.

According to another broad aspect, there is provided a communication system comprising the wireless device summarised above.

According to another broad aspect, there is a method comprising: identifying a time window during which a packet must be transmitted; establishing a communication channel late in the time window but no later than a predetermined time period before expiry of the time window; and transmitting the packet on the communication channel late in the time window.

According to another broad aspect, there is a wireless device adapted to implement the method summarised above.

In some embodiments, the wireless device comprises: a wireless access radio adapted to communication wirelessly with a wireless access network; a radio manager for managing packet transmission on the wireless access radio; and at least one application coupled to the radio manager; wherein: the at least one application provides the packet to be transmitted to the radio manager together with an indication of the time window; and the radio manager manages transmission of the packet.

According to another broad aspect, there is a communication system comprising at least one wireless device summarised above.

Wireless Device

Referring now to FIG. 1, shown is a wireless device 10 coupled to a network 60 through a wireless connection 50. The wireless device 10 has a plurality of applications 11, 12, 13 coupled to a radio manager 20. Although only three applications are shown, more generally, there may be any number of applications. The radio manager 20 is coupled to a wireless access radio 30. The wireless device 10 also has a processor 40. The wireless device 10 may have other components, but they are not shown for sake of simplicity.

In operation, the wireless device 10 is adapted to communicate with the network 60 via the wireless access radio 30 and the wireless connection 50. Such communication includes packet communication, and may include other forms of communication such as circuit switched communication for voice calls. Packet communication over the wireless connection 50 is by means of a communication channel, for example a physical layer traffic channel. The packet communication is in respect of the applications 11, 12, 13, which send and receive packets during operation. The radio manager 20 manages all packet communication for the applications 11, 12, 13.

In some instances, the packet communication includes transmitting packets that have been scheduled for transmission. There are many possibilities for such packets. As a first example, the wireless device 10 transmits scheduled synchronisation packets, which are transmitted according to a schedule for synchronising information between the wireless device 10 and another node. Such packets are ideally transmitted according to the schedule, but may be transmitted earlier if an earlier transmission is more favourable. As a second example, the wireless device 10 transits response packets. In some instances, when the wireless device 10 receives a packet from the network 60, the wireless device 10 is to respond to the packet by transmitting a response packet. A response packet is to be transmitted within a time window from receipt of the packet. An acknowledgement packet is an example of a response packet.

According to an embodiment of the application, when the wireless device 10 is to transmit a packet during some time window, the wireless device 10 transmits the packet at some time during the time window based on whether the communication channel is expected to be torn down during the time window. In some implementations, the radio manager 20 operates in combination with the applications 11, 12, 13 to accomplish this. Examples of how this may be implemented are detailed below with reference to the drawings.

There are many possibilities for the applications 11, 12, 13. The applications 11, 12, 13 may for example include an email application, an internet browser application, or a messenger application. There may be additional applications (not shown) that do not participate in packet communication. The applications 11, 12, 13 may be independently receiving packets and generating packets for transmission via the radio manager 20. In some implementations, the radio manager 20 and the applications 11, 12, 13 are each implemented as software and are executed on the processor 40. More generally, the radio manager 20 and the applications 11, 12, 13 may each be implemented as hardware, software, firmware, or any appropriate combination thereof. Although the radio manager 20 is drawn separately from the applications 11, 12, 13, in the illustrated example, it is to be understood that the radio manager 20 may be integrated with the applications 11, 12, 13.

There are many possibilities for the network 60. The network 60 may include any appropriate wireless network capable of packet transmission, for example a UMTS (Universal Mobile Telecommunications System) network, a GPRS (General Packet Radio Service) network, a CDMA (Code Division Multiple Access) network, or an EVDO (Evolution Data Only) network.

Method for Transmitting Packets

Figure 2:
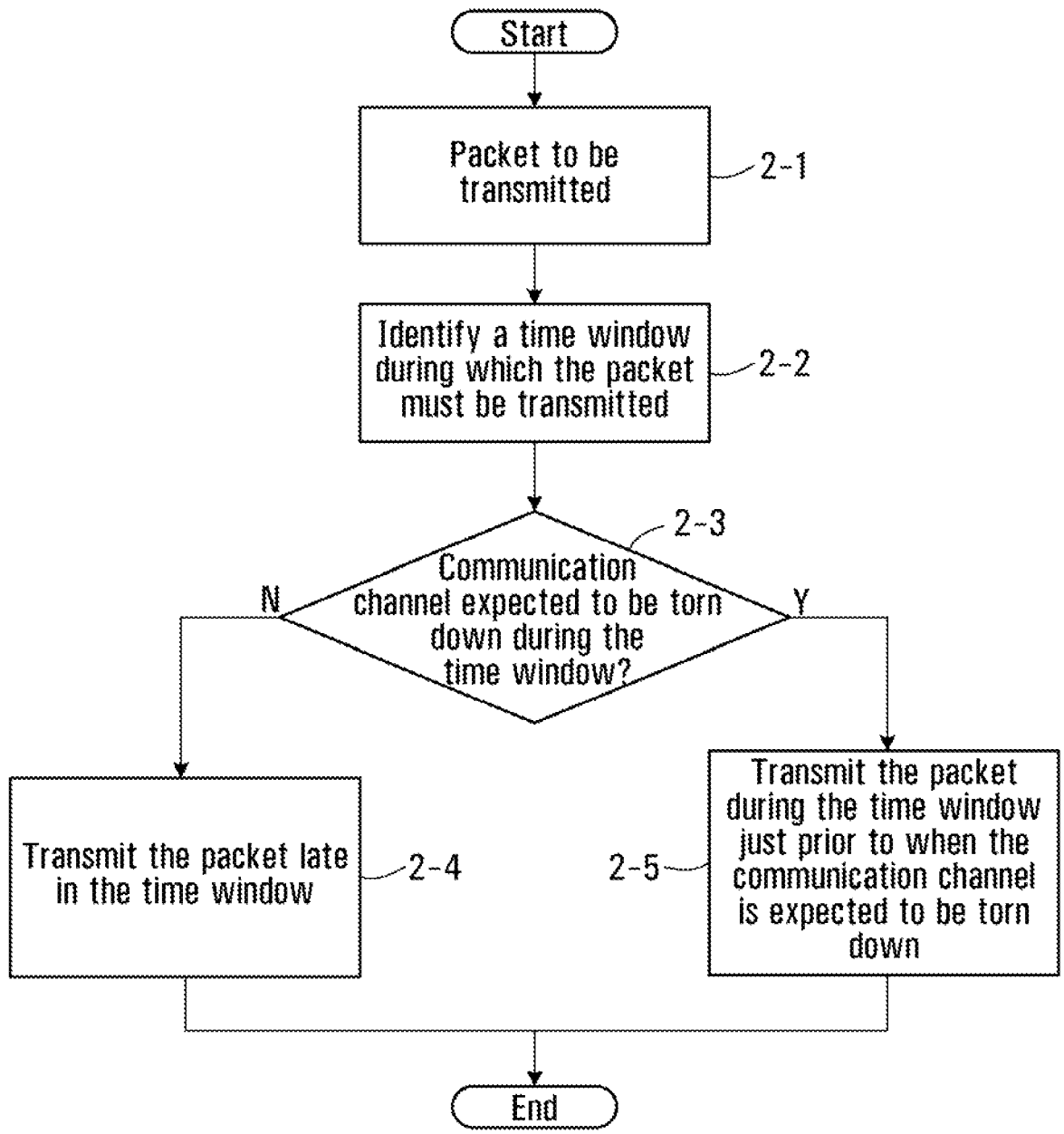
FIG. 2 is a flow chart of an example method of transmitting a packet.

Referring now to FIG. 2, shown is a flow chart of an example method of transmitting a packet. This method may be implemented in a wireless device, for example the wireless device 10 shown in FIG. 1.

If at step 2-1 there is a packet to be transmitted, then at step 2-2 the wireless device identifies a time window during which the packet must be transmitted. The packet is to be transmitted late in the time window, but may be transmitted earlier if an earlier transmission is more favourable. At step 2-3, the wireless device determines whether or not the communication channel is expected to be torn down during the time window. If the communication channel is not expected to be torn down during the time window, then the wireless device transmits the packet late in the time window at step 2-4. However, if the communication channel is expected to be torn down during the time window, then at step 2-5 the wireless device transmits the packet during the time window just prior to when the communication channel is expected to be torn down. This prevents the wireless device from having to re-establish the communication channel to send the packet in the event that the communication channel is torn down.

In the illustrated example, the packet is assumed to be of a packet type that is to be transmitted late in the time window, but may be transmitted earlier if an earlier transmission is more favourable. However, in some implementations, the wireless device determines the type of the packet. If the packet is determined to be a packet type that is to be transmitted late in the time window, but may be transmitted earlier if an earlier transmission is more favourable, then the steps described above in the illustrated example are executed. However, if the packet is determined to be another packet type, then the wireless device may execute a different set of steps. Accordingly, the wireless device discriminates between other types of packets, for example packets that are to be transmitted as soon as possible. In some implementations, the application that is involved in transmitting the packet determines the type of the packet, and the time window if applicable.

There are many implementation specific ways that the wireless device may determine whether or not the communication channel is expected to be torn down. In some implementations, the radio manager determines when and if the communication channel is to be torn down based on packet traffic over the communication channel. For example, the communication channel may be torn down after a period of inactivity. Since there may be multiple applications that may be sending and receiving packets, the activity or inactivity of a single application is not determinative of channel status. For example, when the channel would nominally be torn down after a period of inactivity from a single application, the communication channel would not be torn down in a multiple application context where traffic is experienced from another application in the interim. In some implementations, if a packet is transmitted on the communication channel soon before the communication channel is to be torn down, then the tearing down of the communication channel is delayed due to the activity on the communication channel. Accordingly, in some implementations, the radio manager takes this into consideration when determining when and if the communication channel is to be torn down. In some implementations, the radio manager waits during the time window to see if the communication channel is to be torn down and becomes aware that the communication channel is to be torn down soon enough before it happens so as to transmit the packet before the communication channel is torn down. Other implementations are possible.

It is to be understood that when the communication channel is expected to be torn down during the time window that this does not necessarily mean that the communication channel will be torn down during the time window. For example, if the communication channel is expected to be torn down due to a period of inactivity and a packet is suddenly transmitted, then in some implementations the communication channel is not torn down as expected since there has been new activity.

It is also to be understood that when a packet is transmitted "late in the window" that the precise time of transmission is variable and implementation specific. In some implementations, the packet is transmitted at the last possible moment before expiry of the time window. In other implementations, the packet is transmitted when at least a predefined proportion of the time window, for example 80% of the time window, has expired. Other implementations are possible.

There are many possibilities for transmitting the packet upon determining that the communication channel is expected to be torn down during the time window. In the illustrated example, the packet is transmitted just before the communication channel is expected to be torn down. However, in other implementations, the packet is transmitted as soon as possible. In other implementations, the packet is transmitted as late as possible before the communication channel is expected to be torn down. Other implementations are possible.

There are many possibilities for the packet transmitted in the above example. For example, the packet transmitted may be a scheduled synchronisation packet, a response packet such as an acknowledgement packet, or any other packet to be transmitted during a time window. Further details and embodiments of the method are described below with reference to FIGS. 3 through 18 assuming that the packet to be transmitted is a response packet. However, it is to be understood that there are many possibilities for the packet and that embodiments of the application are not limited to response packets.

Example Sequences of Events

Figure 3:
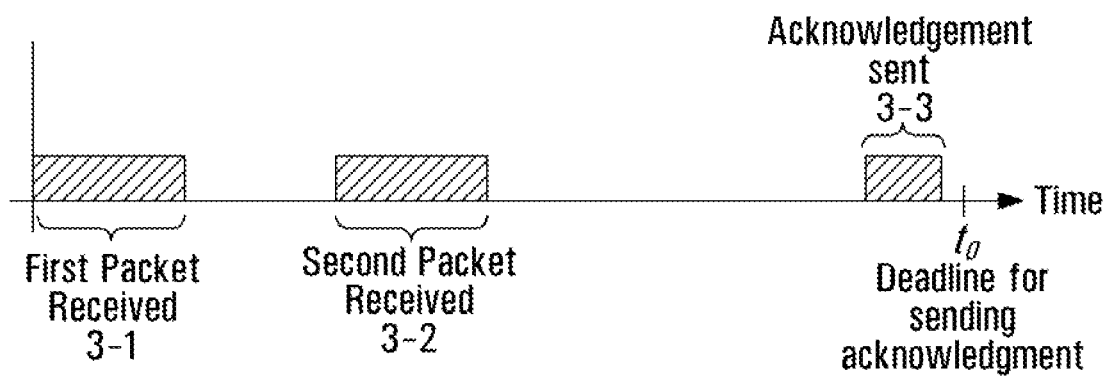
FIGS. 3 and 4 are timelines of example sequences of events.
Figure 4:
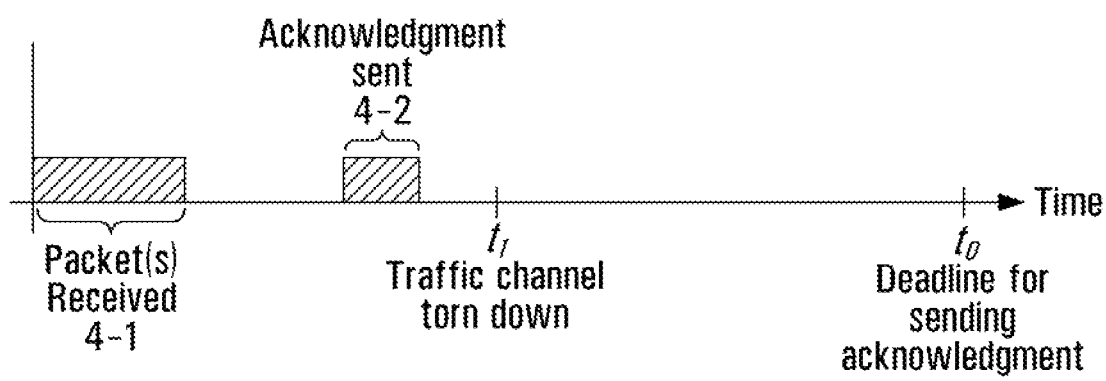

Referring now to FIG. 3, shown as a timeline of an example sequence of events. The events in this timeline are in respect of a wireless device, for example the wireless device 10 shown in FIG. 1.

At step 3-1, the wireless device receives a first packet to which acknowledgement of its receipt is expected. Receipt of the first packet is acknowledged by transmitting a response packet during a time window starting from receipt of the first packet and expiring at time=$t_0$. If the network does not receive an acknowledgment by the deadline at time=$t_0$, then the network will re-send the first packet. Therefore, missing the deadline is to be avoided as this wastes system resources. In the illustrated example, the wireless device does not send a response packet immediately after receipt of the first packet. Instead, the wireless device waits to see if additional packets are received before the deadline at time=$t_0$. During this waiting time, a second packet is received at step 3-2. At step 3-3, a single response packet is transmitted just before time=$t_0$ to acknowledge receipt of both the first packet and the second packet. Transmitting a single response packet typically utilises fewer recourses than transmitting a plurality of response packets. Therefore, waiting during the time window to see if additional packets are received may reduce resource utilization when more than one packet is received and acknowledged by a single response packet.

In the above example, the wireless device waits until late in the time window to transmit the response packet. However, in other situations, the wireless does not do this. An example is provided with reference to FIG. 4, which shows a timeline of another example sequence of events. The events in this timeline are in respect of a wireless device, for example the wireless device 10 shown in FIG. 1.

At step 4-1, the wireless device receives one or more packets to which acknowledgement of their receipt is expected. Receipt of the one or more packets is acknowledged by transmitting a response packet during a time window starting from an earliest receipt of the one or more packets and expiring at time=$t_0$. Some time after receipt of the one or more packets, the wireless device determines that a communication channel used for transmitting packets is expected to be torn down at time=$t_1$. Examples of how the wireless device may determine that the communication channel is expected to be torn down have been provided above with reference to FIG. 2. In view of the communication channel expected to be torn down, the wireless device does not wait until late in the time window to acknowledge receipt of the one or more packets. Instead, at step 4-2 the wireless device transmits a response packet just prior to when the communication channel is expected to be torn down. At time=$t_1$ the communication channel is torn down as expected. Accordingly, if the wireless device were to wait until time=$t_0$ to send the response packet, then the wireless device may need to re-establish the communication channel to transmit the response packet. Therefore, by sending the response packet earlier, the communication channel does not have to be re-established to merely to send the response packet.

Figure 5:
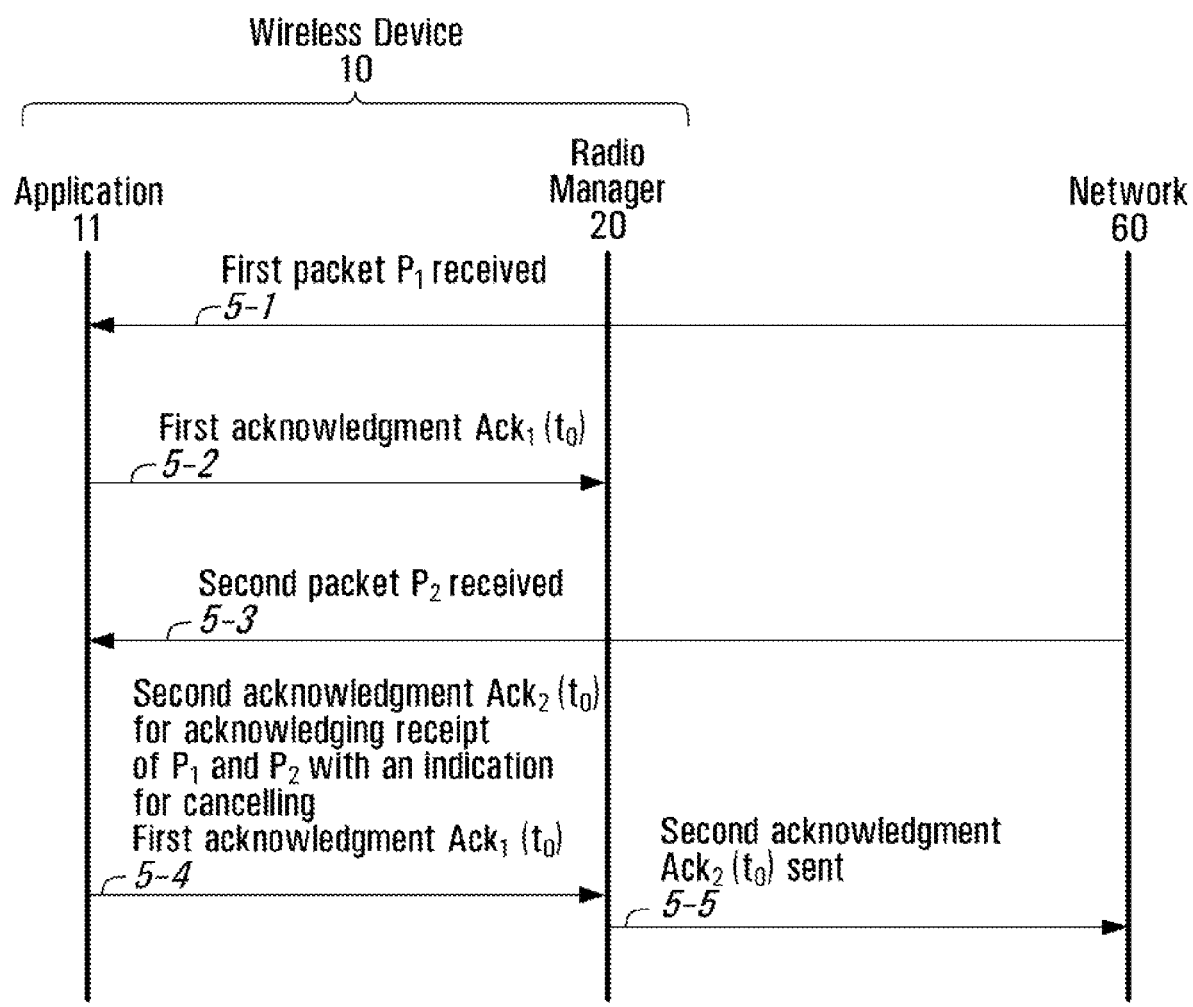
FIG. 5 is a signalling diagram of another example sequence of events.

In some implementations, as shown in FIG. 1, the wireless device 10 has a plurality of applications 11, 12, 13 coupled to a radio manager 20. In such implementations, there would be signalling between the applications 11, 12, 13 and the radio manager 20 during packet exchanges with the network 60. Referring now to FIG. 5, shown is a signalling diagram of example signalling between the application 11 of the wireless device 10, the radio manager 20 of the wireless device 10, and the network 60.

At step 5-1, the network 60 sends a first packet $P_1$ to the wireless device 10. The radio manager 20 receives the first packet $P_1$, identifies that the first packet $P_1$ is intended for the application 11, and forwards the first packet $P_1$ to the application 11. At step 5-2, the application 11 generates a first acknowledgement $Ack_2(t_0)$ for acknowledging receipt of the first packet $P_1$, and sends the first acknowledgement to the radio manager 20. The first acknowledgement $Ack_1(t_0)$ is provided with an indication of a deadline for acknowledging receipt of the first packet $P_1$, namely $t_0$. The indication of the deadline is provided to the radio manager 20 so that the radio manager 20 is aware of when the time window for transmitting the acknowledgement expires. The radio manager 20 determines when the acknowledgement is to be sent during the time window based on whether or not the communication channel used for transmitting acknowledgements is expected to be torn down during the time window.

In the illustrated example, the communication channel is not expected to be torn down during the time window. Therefore, the radio manager 20 waits during the time window to transmit the acknowledgement late in the time window. During this waiting time, the network 60 sends a second packet $P_2$ to the wireless device 10 at step 5-3. The radio manager 20 receives the second packet $P_2$, identifies that the second packet $P_2$ is intended for the application 11, and forwards it to the application 11. It is assumed that this takes place prior to time=$t_0$. At step 5-4 the application 11 generates a second acknowledgement $Ack_2(t_0)$ for acknowledging receipt of the first packet $P_1$, and the second packet $P_2$, and provides the second acknowledgement to the radio manager 20. The second acknowledgement $Ack_2(t_0)$ is provided with an indication of the deadline for acknowledging receipt of the first packet $P_1$, namely $t_0$. The second acknowledgement $Ack_2(t_0)$ is provided with an indication, for example a bit set, to cancel the first acknowledgement $Ack_1(t_0)$. At step 5-5 the radio manager 20 sends the second acknowledgement $Ack_2(t_0)$ late in the time window.

In some implementations, the acknowledgements are provided to the radio manager 20 as soon as possible so that the radio manager 20 is aware of the acknowledgements. This allows the radio manager to send an acknowledgement earlier if the communication channel is expected to be torn down before expiry of the time window.

In the illustrated example, the second acknowledgement $Ack_2(t_0)$ is provided with an indication to cancel the first acknowledgement $Ack_1(t_0)$. However, more generally, any appropriate indication to cancel the first acknowledgement $Ack_1(t_0)$ may be provided by the application 11. In some implementations, receipt of the second acknowledgement $Ack_2(t_0)$ by the radio manager 20 serves as an implicit cancelling of the first acknowledgement $Ack_1(t_0)$. In other implementations, the application 11 provides a separate cancelling message. In some implementations, the first acknowledgement $Ack_2(t_0)$ is cancelled at the same time as the application 11 provides the second acknowledgement $Ack_2(t_0)$ to the radio manager 20. In other implementations, the first acknowledgement $Ack_2(t_0)$ is cancelled just prior to the application 11 providing the second acknowledgement $Ack_2(t_0)$ to the radio manager 20. Other implementations are possible.

Although only two packets are received in the illustrated example, it is to be understood that more or less packets may be received and acknowledged by a single acknowledgement. For example, if a third packet is received during the time window, then receipt of all three packets may be acknowledged by a single acknowledgement message.

Method in Application

Figure 6:
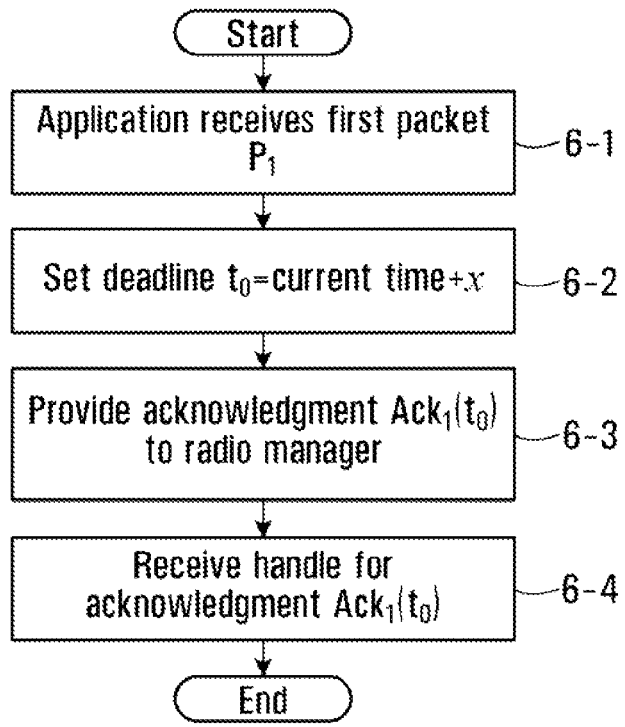
FIGS. 6 through 8 are flow charts of an example method in an application of acknowledging receipt of packets.
Figure 7:
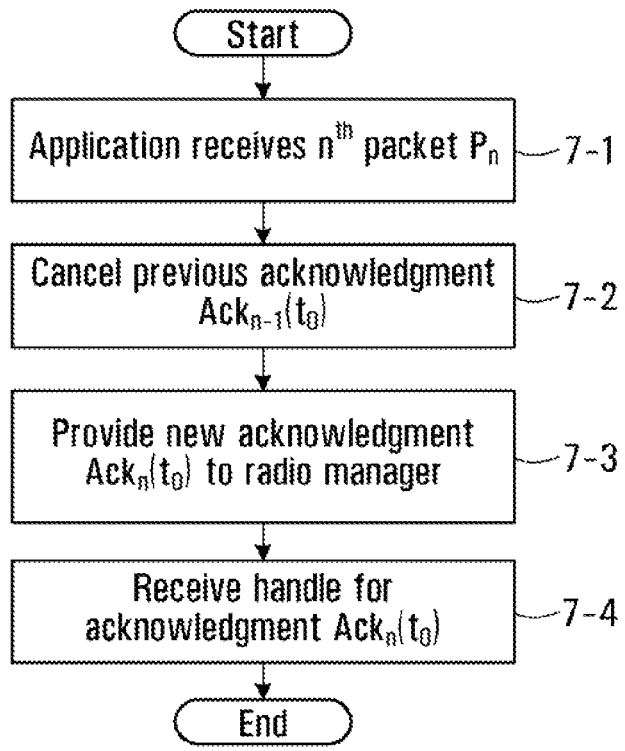
Figure 8:
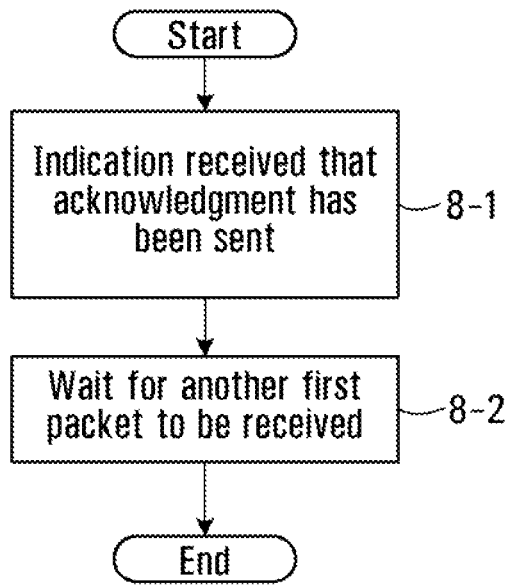

Referring now to FIGS. 6 through 8, shown are flow charts of an example method in an application of acknowledging receipt of packets. This method may be implemented in an application of a wireless device, for example by any one of the applications 11, 12, 13 of the wireless device 10 shown in FIG. 1. It is to be understood that the method described below with reference to FIGS. 6 through 8 is a very specific method and is provided merely as an example.

The steps of FIG. 6 are executed upon receipt of a first packet. If at step 6-1 the application receives a first packet $P_1$, then at step 6-2 the application sets a deadline of $t_0$=current time+x, where x denotes an amount of time that the wireless device has to acknowledge receipt of the first packet $P_1$. The value for x is implementation specific and may be dependent upon the packet received. At step 6-3, the application provides an acknowledgement $Ack_1(t_0)$ to the radio manager. An indication of the deadline at time=$t_0$ is provided with the acknowledgement so that the radio manager is informed of the deadline for transmitting the acknowledgement. At step 6-4 the application receives from the radio manager a handle for the acknowledgement $Ack_1(t_0)$. The handle allows the application to reference the acknowledgement $Ack_1(t_0)$ at a later time. This allows the application to cancel the acknowledgement $Ack_1(t_0)$ at a later time should the application replace the acknowledgement $Ack_1(t_0)$ with a subsequent acknowledgement $Ack_2(t_0)$.

The steps of FIG. 7 are executed upon receipt of each subsequent packet prior to the acknowledgment of the first packet. If at step 7-1 the application receives an $n^{th}$ packet $P_n$, where n is any integer greater than 1, then at step 7-2 the application cancels the previous acknowledgement $Ack_{n-1}(t_0)$ using the handle received at step 6-4. At step 7-3, the application sends a new acknowledgement $Ack_n(t_0)$ to the radio manager. The new acknowledgement $Ack_0(t_0)$ is provided with an indication of the same deadline at time=$t_0$ for acknowledging receipt of the first packet $P_1$ and all subsequent packets received of the n-packets. At step 7-4 the application receives from the radio manager a handle for the acknowledgement $Ack_n(t_0)$. This step is similar to step 6-4 described above.

It is possible that the wireless device will not receive every packet that has been sent to the wireless device. In the event that a packet is not received by the wireless device, the steps of FIG. 7 are not executed. At some later time, when there has been no acknowledgment of the packet, the packet will be sent again to the wireless device.

The steps of FIG. 8 are executed when an indication is received from the radio manager that the acknowledgement has been sent. If at step 8-1 an indication is received from the radio manager that the acknowledgment has been sent, then at step 8-2 the application assumes that the radio manager has sent the acknowledgement to the network for acknowledging receipt of all packets received and waits until another first packet is received at step 6-1.

The deadline for acknowledging receipt of the first packet has been calculated as the sum of the current time and the time given to the wireless device to acknowledge receipt of the first packet. In other implementations, $t_0$ may be equal to the time remaining for acknowledging receipt of the first packet $P_1$. In this implementation, $t_0$ would be equal to x for the first acknowledgement $Ack_1(t_0)$, and de-incremented for subsequent acknowledgements $Ack_n(t_0)$ according to how much time has passed since receipt of the first packet $P_1$. Accounting of times may be implemented by means of counters or timers. Other implementations are possible.

Method in a Radio Manager

Referring now to FIGS. 9 through 12, shown are flow charts of an example method in a radio manager of acknowledging receipt of packets. This method may be implemented in a radio manager, for example by the radio manager 20 of the wireless device 10 shown in FIG. 1. It is to be understood that the method described below with reference to FIGS. 9 through 12 is a very specific method and is provided merely as an example.

Figure 9:
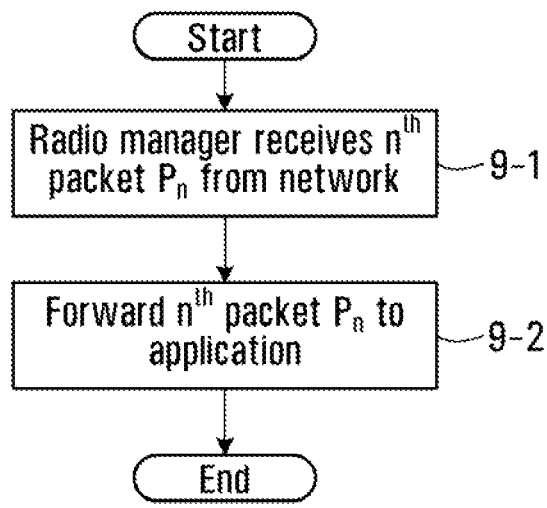
FIGS. 9 through 13 are flow charts of an example method in a radio manager for acknowledging receipt of packets.

The steps of FIG. 9 are executed upon receiving a packet from the network. If at step 9-1 the radio manager receives an $n^{th}$ packet $P_n$ from the network, where n is any positive integer, then at step 9-2 the radio manager forwards the $n^{th}$ packet $P_n$ to the application. As previously described, when the application receives a packet, it generates an acknowledgement and provides the acknowledgement to the radio manager together with an indication of a deadline at time=$t_0$ for transmitting the acknowledgement.

Figure 10:
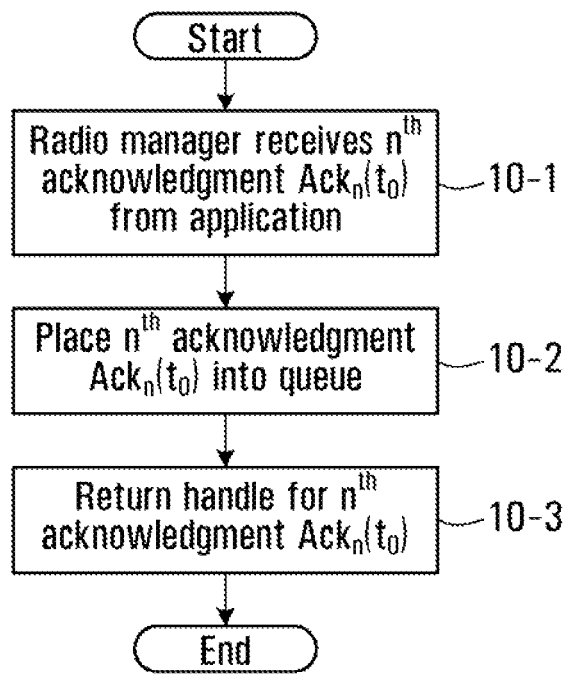

The steps of FIG. 10 are executed upon receipt of an acknowledgment from the application. If at step 10-1 the radio manager receives an $n^{th}$ acknowledgement $Ack_n(t_0)$ from the application, then at step 10-2 the radio manager places the $n^{th}$ acknowledgement $Ack_n(t_0)$ into a queue together with the indication of the deadline. At step 10-3 the radio manager returns a handle to the application so that the application may refer to the acknowledgement at a later time.

Figure 11:
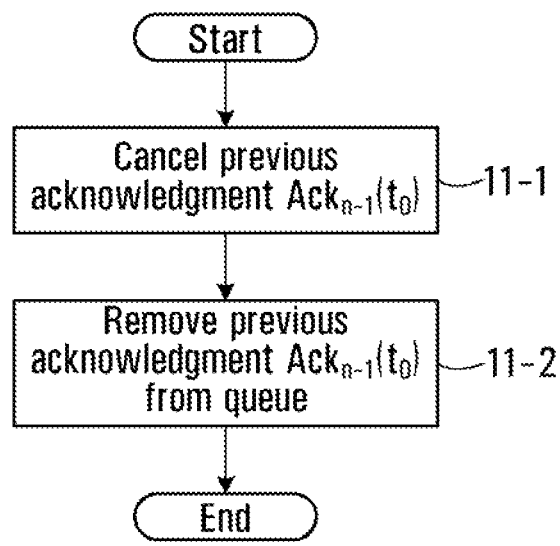

The steps of FIG. 11 are executed upon receiving an instruction to cancel a previous acknowledgement. If at step 11-1 the radio manager is instructed by the application to cancel a previous acknowledgement $Ack_{n-1}(t_0)$ using the handle provided to the application at step 10-3, then at step 11-2 the radio manager removes the previous acknowledgement $Ack_{n-1}(t_0)$ from the queue together with the indication of the deadline.

Since there may be a plurality of applications, each of which may be providing acknowledgements to the radio manager, the queue may have a plurality of acknowledgements to be transmitted. The queue may be implemented in any appropriate manner, for example as a data record. The queue contains an identification of each acknowledgement to be transmitted, and their respective deadlines (e.g. $t_0$) for transmitting the acknowledgement.

Figure 12:
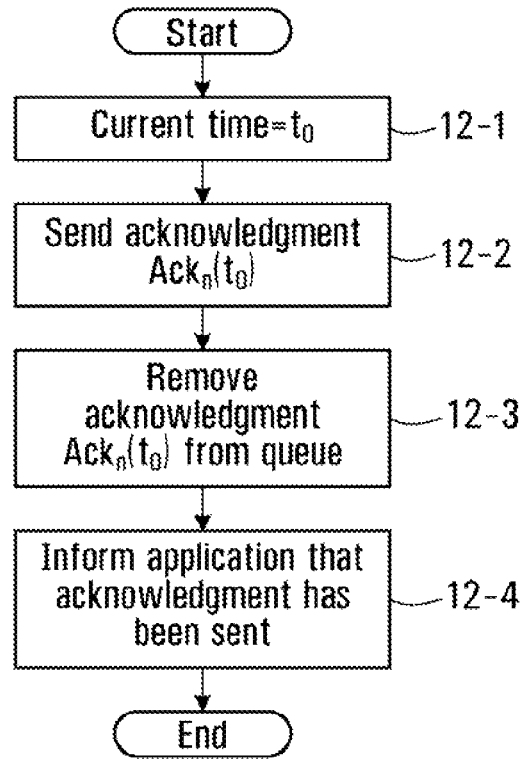

The steps of FIG. 12 are implemented upon arrival of time=$t_0$. If at step 12-1 the radio manager determines that the current time is equal to the deadline for transmitting one of the packets in the queue, for example at time=$t_0$, then at step 12-2 the radio manager sends the acknowledgement $Ack_n(t_0)$. In this case, the acknowledgement $Ack_n(t_0)$ is transmitted late in the window. At step 12-3 the acknowledgement $Ack_n(t_0)$ is removed from the queue together with the indication of the deadline. At step 12-4, the radio manager informs the application that the acknowledgement $Ack_n(t_0)$ has been sent.

Figure 13:
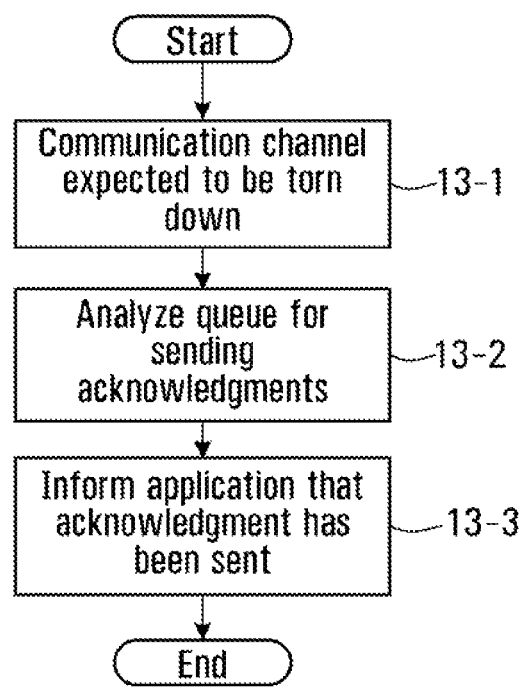

The steps of FIG. 13 are implemented upon determining that the communication channel is to be torn down. If at step 13-1 the radio manager determines that the communication channel is expected to be torn down, then at step 12-2 the radio manager analyzes the queue for sending acknowledgements. In this case, the acknowledgement may be transmitted earlier in the time window. For each acknowledgement sent, the radio manager informs the respective applications at step 13-3 that the acknowledgement has been sent. Upon receipt of such indication, the respective application exits at step 8-2 as described above with reference to FIG. 8.

There are many ways that the radio manager can analyze the queue for sending acknowledgements. Referring now to FIGS. 14 through 18, shown are flow charts of example methods of analyzing the queue for sending acknowledgements. One or more of these methods may be implemented by a radio manager, for example by the radio manager 20 of the wireless device 10 shown in FIG. 1.

Figure 14:
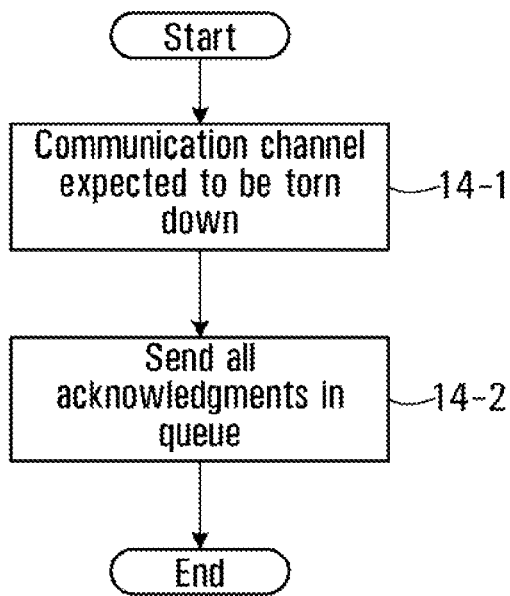
FIGS. 14 through 18 are flow charts of example methods in a radio manager of analyzing an acknowledgement queue for sending acknowledgements.

Referring first to FIG. 14, in one example, if the radio manager determines at step 14-1 that the communication channel is expected to be torn down, then at step 14-2 the radio manager sends all acknowledgements contained in the queue.

Figure 15:
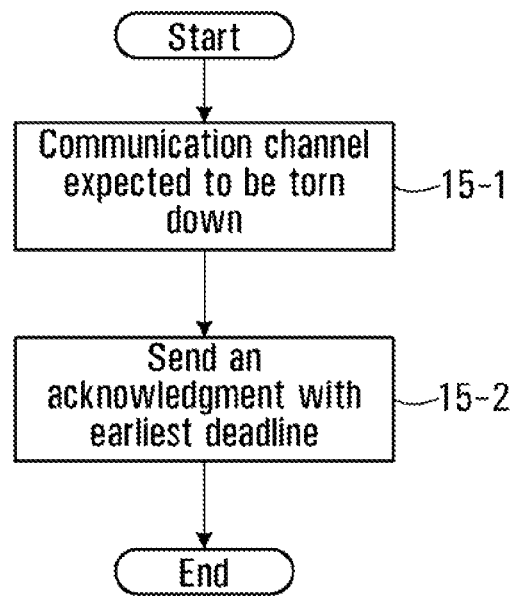

Referring now to FIG. 15, in another embodiment, if the radio manager determines at step 15-1 that the communication channel is expected to be torn down, then at step 15-2 the radio manager sends only the acknowledgement in the queue having the earliest deadline.

Figure 16:
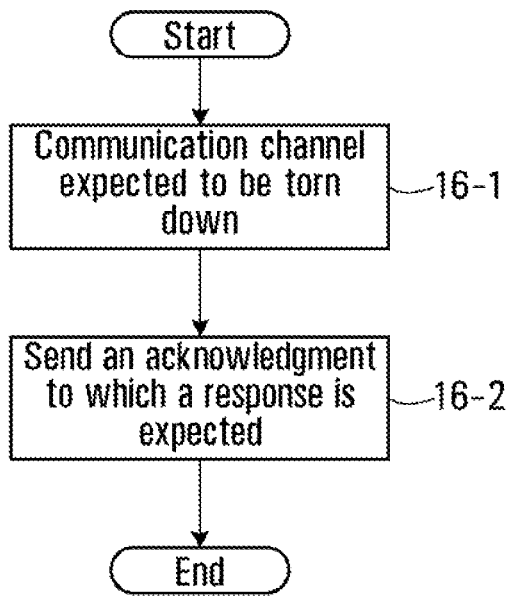

Referring now to FIG. 16, in another embodiment, if the radio manager determines at step 16-1 that the communication channel is expected to be torn down, then at step 16-2 the radio manager sends a particular acknowledgement from the queue such that the radio manager expects a response from the network upon receipt of the particular acknowledgement.

In some implementations, the radio manager is provided with logic to determine which acknowledgements in the queue, when transmitted, will likely result in the network responding to the acknowledgement. The logic may be part of the radio manager, or separate. In other implementations, the application corresponding to the particular acknowledgement indicates whether or not a response from the network is expected. Responses from the network may be dependent upon the particular application. For example, a web browser application may expect a response from the network in response to transmission of an acknowledgement packet, while other applications would not.

In some implementations, receipt of a response from the network has the effect of delaying the tearing down of the communication channel. This allows the transmission of other packets in the queue to be delayed, provided that their respective time windows permit so. Delaying the tearing down of the traffic channel may be done so many times in a row. For example, the method of FIG. 16 may be repeated many times in sequence so as to keep the communication channel active.

Figure 17:
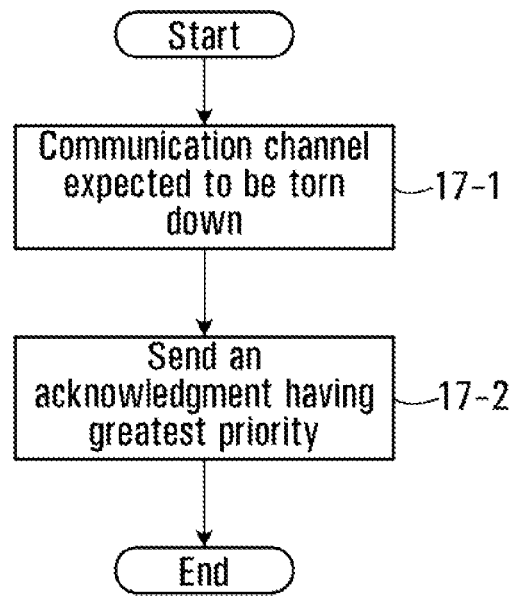

In other embodiments, at least some acknowledgements in the queue are provided with a respective priority level. The priority levels may be provided to the radio manager by the respective application. Alternatively, the priority levels may be computed based on some logic. The logic may be part of the radio manager, or separate. Referring now to FIG. 17, if the radio manager determines at step 17-1 that the communication channel is expected to be torn down, then at step 17-2 the radio manager sends a particular acknowledgement from the queue, the particular acknowledgement having a highest priority of all of the acknowledgements in the queue.

Figure 18:
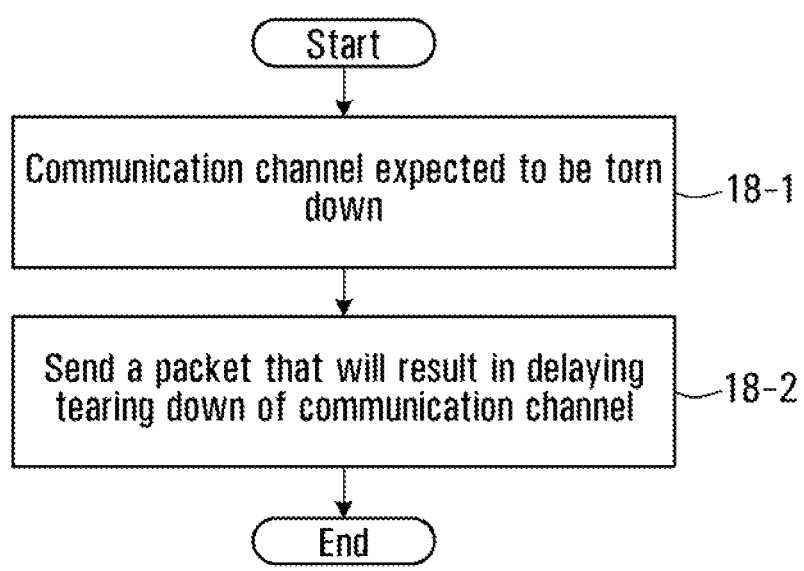

As previously described, in some implementations, sending a packet to which a response is expected soon before the communication channel is to be torn down delays the tearing down of the communication channel. Referring now to FIG. 18, if the radio manager determines at step 18-1 that the communication channel is expected to be torn down, then at step 18-2 the radio manager sends a packet from the queue, wherein transmission of the packet has the effect of delaying the tearing down of the communication channel. Much like the method described with reference to FIG. 16, the transmission of other packets in the queue to be delayed, provided that their respective time windows permit so, and the method of FIG. 18 may be repeated in sequence so as to keep the communication channel active.

Resource Utilization Estimation

Figure 19:
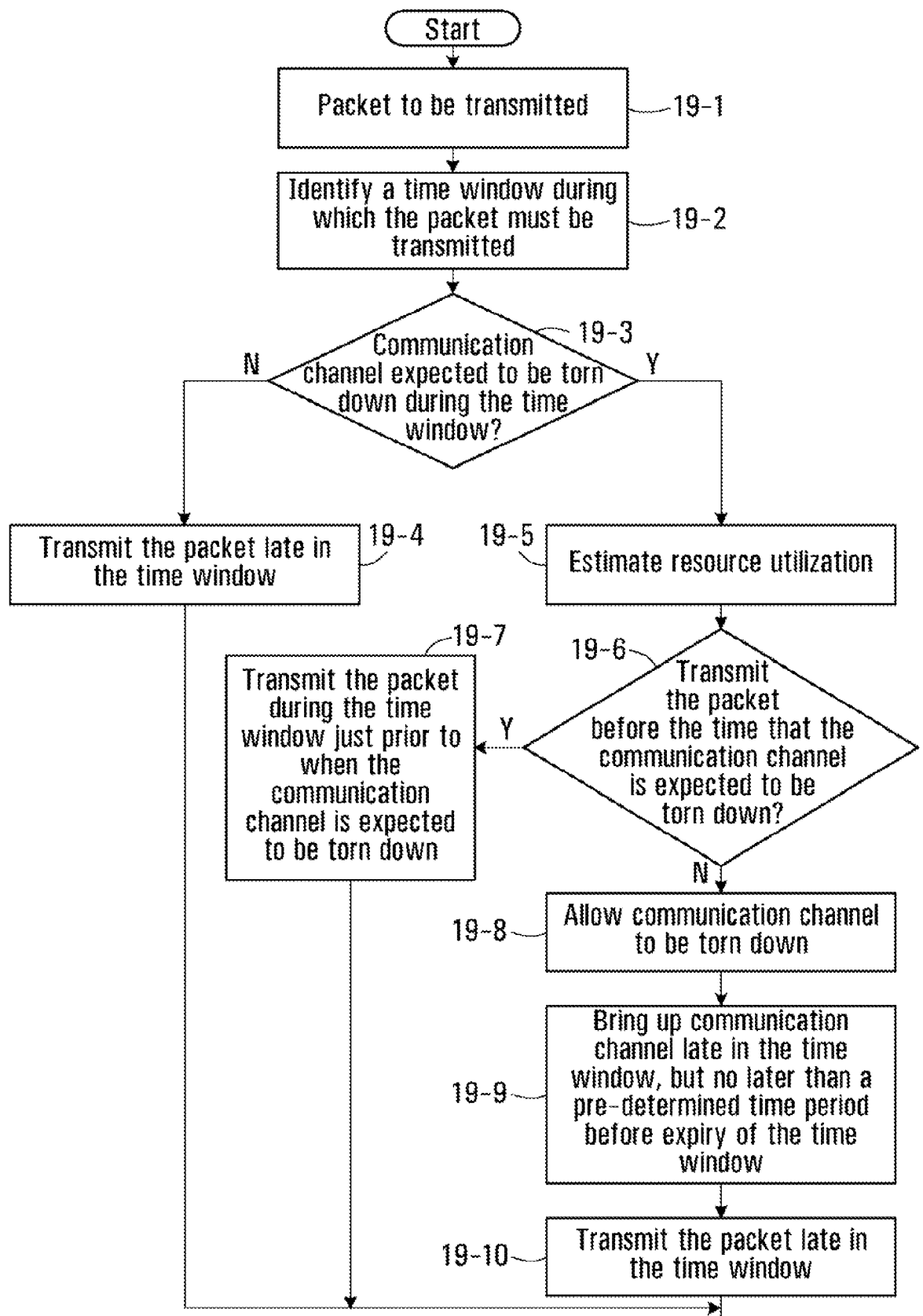
FIG. 19 is a flowchart of another example method of transmitting a packet.

In the examples presented above, if the communication channel is expected to be torn down in the time window during which a packet must be transmitted, then the packet is transmitted before the communication channel is torn down. However, in other embodiments, the wireless device may allow the communication channel to be torn down and instead transmit the packet at some later time. The decision to allow the communication channel to be torn down can be based on estimated resource utilisation for transmitting the packet before and after the time that the communication channel is expected to be torn down. Referring now to FIG. 19, shown is a flowchart of another example method of transmitting a packet. This method may be implemented in a wireless device, for example the wireless device 10 shown in FIG. 1.

If at step 19-1 there is a packet to be transmitted, then at step 19-2 the wireless device identifies a time window during which the packet must be transmitted. The packet is to be transmitted late in the time window, but may be transmitted earlier if an earlier transmission is more favourable. At step 19-3, the wireless device determines whether or not the communication channel is expected to be torn down during the time window. If the communication channel is not expected to be torn down during the time window, then the wireless device transmits the packet late in the time window at step 19-4. However, if the communication channel is expected to be torn down during the time window, then at step 19-5 the wireless device estimates resource utilisation for transmitting the packet before and after the time that the communication channel is expected to be torn down. Based on the estimation, the wireless device determines at step 19-6 whether or not the packet should be transmitted before the time that the communication channel is expected to be torn down.

If the wireless device determines that the packet should be transmitted before the time that the communication channel is expected to be torn down, then at step 19-7 the wireless device transmits the packet during the time window just prior to the time that the communication channel is expected to be torn down. This prevents the wireless device from having to re-establish the communication channel to send the packet in the event that the communication channel is torn down. However, if the wireless device determines that the packet should be transmitted after the time that the communication channel is expected to be torn down, then at step 19-8 the wireless device allows the communication channel to be torn down without sending the packet. In the illustrated examples, it is assumed that the communication channel is torn down as expected.

At step 19-9, the communication channel is brought up late in the time window, but no later than a predetermined time period before expiry of the time window. The predetermined time period allows time for the communication channel to be established and allows for the packet to be transmitted at step 19-10 before the time window expires.

In some implementations, the wireless device incorporates many considerations when estimating resource utilisation for transmitting the packet before and after the time that the communication channel is expected to be torn down. For example, the wireless device may consider the time window and when the communication channel is expected to be torn down. Transmitting a packet late in the time window may utilise fewer resources than transmitting the packet earlier. An example of this is the case of acknowledging received packets. As previously described, waiting until late in the time window to transmit a single acknowledgment packet to acknowledge receipt of more than one packet generally utilises fewer resources than transmitting a plurality of individual acknowledgment packets. However, there are instances when transmitting a packet late in the communication window may utilise more resources, for example if the communication channel is torn down and needs to be re-established. As another example, the wireless device may consider the state of the wireless device. Establishing the traffic channel while in a first state may utilise fewer resources than when in a second state. Other considerations are possible.

In some implementations, if the time window expires at a time that is much later than when the communication channel is expected to be torn down, then the wireless device determines that packet should be transmitted after the time that the communication channel is expected to be torn down. Likewise, if the time window expires at a time that is not much later than when the communication channel is expected to be torn down, then the wireless device determines that packet should be transmitted before the time that the communication channel is expected to be torn down. The quantity defining "much later" is implementation specific. In some implementations, a threshold value is defined for the quantity, for example 10 minutes. In other implementations, the threshold value is 2 minutes. Other implementations are possible.

It is to be understood that when estimating resources utilisation there may be several different types of resources that are considered. For example, any one or more of network resources, battery power of the wireless device, and time involved in establishing the communication channel may be considered.

Bringing Up the Communication Channel

Figure 20:
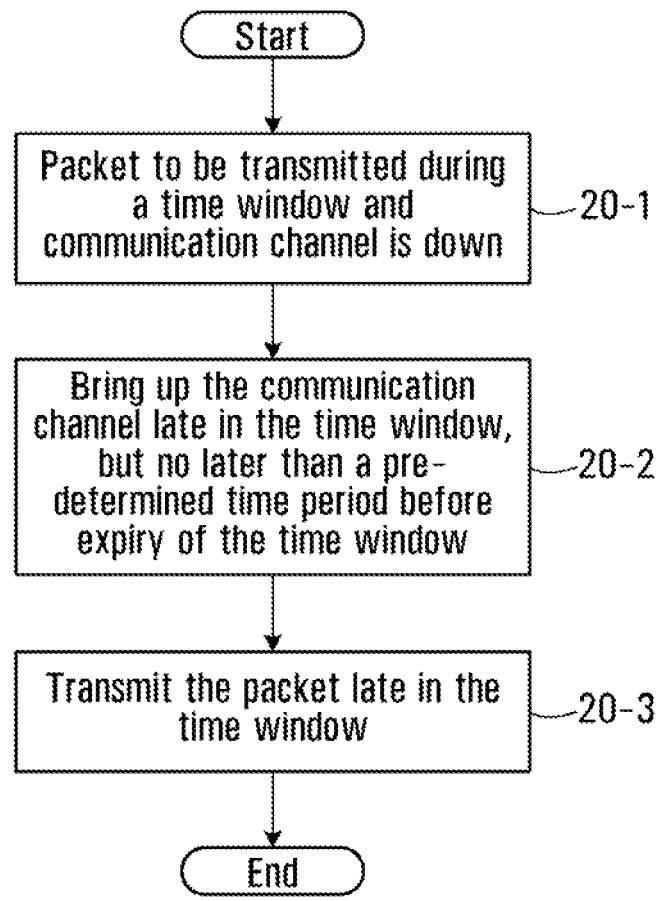
FIG. 20 is a flowchart of yet another example method of transmitting a packet.

In the examples presented above, it is assumed that the communication channel is established when it is determined that there is a packet to be transmitted during a time window. However, in some instances, the communication channel is not established at such time. Referring now to FIG. 20, shown is a flowchart of yet another example method of transmitting a packet. This method may be implemented in a wireless device, for example the wireless device 10 shown in FIG. 1.

At step 20-1 the wireless device determines that there is a packet to be transmitted during a time window while the communication channel is down. At step 20-2 the communication channel is brought up late in the time window, but no later than a predetermined time period before expiry of the time window. The predetermined time period allows time for the communication channel to be established and allows for the packet to be transmitted at step 20-3 before the time window expires.

The time required to establish the traffic channel may be dependent on one or more factors. For example, establishing the traffic channel while the wireless device is in a first state may take longer than if the wireless device were in a second state. Accordingly, in some implementations, the predetermined time period is chosen appropriately to accommodate for such one or more factors. The predetermined time period may be fixed, or variable depending on the one or more factors.

Many example methods of transmitting a packet have been provided above with reference to the drawings. It is to be understood that these methods may be implemented individually, or in any appropriate combination. For example, the method described with reference to FIG. 20 may be implemented in combination with the method described with reference to FIG. 2. Other appropriate combinations are may be contemplated.

Numerous modifications and variations of the present application are possible in light of the above teachings. It is therefore to be understood that within the scope of the appended claims, the application may be practised otherwise than as specifically described herein.

I claim:

1. A method comprising:

establishing one or more communication channels between a wireless device and a network;

receiving a plurality of packets over a communication channel;

identifying a time window during which a response packet for the plurality of packets must be transmitted over the one or more communication channels, transmission of the response packet being associated with tearing down of the particular communication channel;

monitoring packet traffic over the communication channels to identify whether the communication channel is expected to be torn down during the time window; and transmitting a single response packet after a last of the plurality of packets is received on the communication channel at some time during the time window based on whether the communication channel is expected to be torn down during the time window;

wherein response packets to be transmitted in respect to communication over the one or more communications channels are stored in a queue;

if the communication channel is expected to be torn down, analyzing the queue for transmitting at least one of the plurality of response packets;
wherein the analyzing comprises at least one of:
a) transmitting all of the plurality of response packets stored in the queue before the communication channel is torn down;
b) transmitting an oldest response packet of the plurality of response packets stored in the queue, the respective time window of the oldest response packet expiring before any other respective time window;
c) transmitting a particular packet of the plurality of response packets stored in the queue, wherein a response packet is expected to be received in response to transmission of the particular response packet;
d) transmitting a highest priority response packet of the plurality of response packets stored in the queue, the highest priority response packet having a priority level greater than or equal to those of other response packets in the queue; and
e) transmitting a delaying packet of the plurality of response packets stored in the queue, wherein transmission of the delaying packet causes tearing down of the communication channel to be delayed.

2. The method of claim 1 wherein transmitting the response packet comprises:
transmitting the response packet late in the time window if the communication channel is not expected to be torn down during the time window.

3. The method of claim 1 wherein transmitting the response packet comprises:
if the communication channel is expected to be torn down during the time window, transmitting the response packet during the time window just prior to when the communication channel is expected to be torn down.

4. The method of claim 1 further comprising:
determining whether the response packet is of a packet type that is to be transmitted late in the time window, but may be transmitted earlier if an earlier transmission is more favourable.

5. The method of claim 1 further comprising:
receiving a first packet;
wherein the response packet transmitted on the communication channel is generated in response to receipt of the first packet.

6. The method of claim 5 wherein the time window starts from receipt of the first packet and has a duration based on a deadline for responding to receipt of the first packet.

7. The method of claim 1 wherein the plurality of packets received comprise a first packet, wherein the time window starts from receipt of the first packet received.

8. The method of claim 1 wherein the response packet transmitted is one packet of a plurality of response packets to be transmitted in respect of a plurality of communications, each of the plurality of response packets having a respective time window during which the response packet must be transmitted, the method further comprising:
maintaining in said queue, the plurality of response packets and their respective time window.

9. The method of claim 8 further comprising:
adding response packets that are to be transmitted to the queue together with their respective time windows; and
removing response packets that have been transmitted from the queue together with their respective time windows.

10. The method of claim 1 wherein the communication channel is a physical layer traffic channel.

11. The method of claim 1 implemented co-operatively by a radio manager and at least one application, the method further comprising:
the at least one application providing the radio manager with the response packet to be transmitted together with an indication of the time window during which the response packet must be transmitted; and
the radio manager managing transmission of the response packet.

12. The method of claim 1 wherein the response packet is a response for all of the plurality of packets received.

13. The method of claim 1 further comprising generating a respective response packet for each of the plurality of packets received.

14. The method of claim 1 wherein the response packet is a response to a last packet of the plurality of packets.

15. A non-transitory computer readable medium having computer readable instructions stored thereon for execution on a wireless device so as to implement the method of claim 1.

16. A mobile wireless device comprising:
a wireless access radio configured to communicate wirelessly with a wireless access network; and
a radio manager configured to manage packet transmission on the wireless access radio by:
receiving a plurality of packets over one or more communication channels;
identifying a time window for the plurality of packets during which a response packet must be transmitted over the one or more communication channels, transmission of the response packet being associated with tearing down of a particular communication channel;
monitoring packet traffic over the communication channels to identify whether the communication channel is expected to be torn down during the time window; and
transmitting a single response packet after a last of the plurality of packets is received
at some time during the time window based on whether or not the communication channel is expected to be torn down during the time window;
wherein response packets to be transmitted in respect to communication over the one or more communications channels are stored in a queue;
if the communication channel is expected to be torn down, analyzing the queue for transmitting at least one of the plurality of response packets;
wherein the analyzing comprises at least one of:
a) transmitting all of the plurality of response packets stored in the queue before the communication channel is torn down;
b) transmitting an oldest response packet of the plurality of response packets stored in the queue, the respective time window of the oldest response packet expiring before any other respective time window;
c) transmitting a particular packet of the plurality of response packets stored in the queue, wherein a response packet is expected to be received in response to transmission of the particular response packet;
d) transmitting a highest priority response packet of the plurality of response packets stored in the queue, the highest priority response packet having a priority level greater than or equal to those of other response packets in the queue; and
e) transmitting a delaying packet of the plurality of response packets stored in the queue, wherein transmission of the delaying packet causes tearing down of the communication channel to be delayed.

17. The wireless device of claim 16 wherein:
the radio manager is configured to receive the response packet to be transmitted from an application together with an indication of the time window; and
the radio manager is configured to manage transmission of the response packet.

18. A communication system comprising at least one mobile wireless device according to claim 16.

* * * * *